(12) United States Patent
Vogt et al.

(10) Patent No.: US 9,896,372 B2
(45) Date of Patent: Feb. 20, 2018

(54) METHOD AND APPARATUS FOR SCORING THIN GLASS AND SCORED THIN GLASS

(71) Applicant: SCHOTT AG, Mainz (DE)

(72) Inventors: Jürgen Vogt, Oberheimbach (DE); Matthias Jotz, Alfeld (DE)

(73) Assignee: SCHOTT AG, Mainz (DE)

( * ) Notice: Subject to any disclaimer, the term of this patent is extended or adjusted under 35 U.S.C. 154(b) by 0 days.

(21) Appl. No.: 14/956,153

(22) Filed: Dec. 1, 2015

(65) Prior Publication Data

US 2016/0185647 A1     Jun. 30, 2016

(30) Foreign Application Priority Data

Dec. 1, 2014   (DE) .................. 10 2014 117 641
May 21, 2015   (DE) .................. 10 2015 108 061

(51) Int. Cl.
| | | |
|---|---|---|
| *C03B 33/027* | (2006.01) | |
| *C03B 33/037* | (2006.01) | |
| *C03B 33/033* | (2006.01) | |
| *C03C 3/087* | (2006.01) | |
| *C03C 3/091* | (2006.01) | |
| *C03C 3/093* | (2006.01) | |
| *C03C 3/095* | (2006.01) | |
| *C03C 3/097* | (2006.01) | |

(Continued)

(52) U.S. Cl.
CPC .......... *C03B 33/027* (2013.01); *C03B 33/033* (2013.01); *C03B 33/037* (2013.01); *C03B 33/10* (2013.01); *C03B 33/105* (2013.01); *C03C 3/087* (2013.01); *C03C 3/091* (2013.01); *C03C 3/093* (2013.01); *C03C 3/095* (2013.01); *C03C 3/097* (2013.01); *C03C 3/11* (2013.01)

(58) Field of Classification Search
CPC ... C03B 33/027; C03B 33/033; C03B 33/037; C03C 3/087; C03C 3/091; C03C 3/093; C03C 3/095; C03C 3/11; B62D 3/08; Y10T 83/159; Y10T 83/0348; Y10T 83/0341; Y10T 83/527
USPC ... 83/881, 880, 76, 361, 861, 879, 886, 362, 83/363
See application file for complete search history.

(56) References Cited

U.S. PATENT DOCUMENTS 3,399,586 A * 9/1968 Insolio ................... C03B 33/10
                                                       83/881
4,027,562 A * 6/1977 Bonaddio .............. B26D 3/085
                                                       33/32.3

(Continued)

FOREIGN PATENT DOCUMENTS

| EP | 2147900 | 1/2010 |
|---|---|---|
| JP | S6186433 | 5/1986 |
| JP | H02221134 | 9/1990 |

(Continued)

*Primary Examiner* — Ghassem Alie
(74) *Attorney, Agent, or Firm* — Ohlandt, Greeley, Ruggiero & Perle, L.L.P.

(57) ABSTRACT

A method and apparatus for scoring thin glass for the purpose of score and break separation as well as an accordingly prepared scored thin glass are provided. The scoring tool is pressed onto the thin glass and drawn along the scoring line with an adjusted scoring contact pressure force as a vertical scoring force component. This permits to production of prescored ultrathin glass of Knoop hardness from 350 to 650 with a score depth from 1/20 to 4/5 of the material thickness.

23 Claims, 1 Drawing Sheet

(51) Int. Cl.
*C03C 3/11* (2006.01)
*C03B 33/10* (2006.01)

(56) References Cited

U.S. PATENT DOCUMENTS

| | | | | |
|---|---|---|---|---|
| 4,030,815 | A | * | 6/1977 | Andrevski .......... F16C 32/0603 359/823 |
| 4,726,500 | A | * | 2/1988 | Rock ....................... B26F 3/002 225/96.5 |
| 5,038,654 | A | * | 8/1991 | Mackey ................... B26D 3/08 83/361 |
| 2006/0255083 | A1 | * | 11/2006 | Bonaddio ........... C03B 33/0235 225/2 |
| 2010/0209685 | A1 | | 8/2010 | Weber et al. |
| 2011/0240499 | A1 | | 10/2011 | Taniguchi |
| 2013/0189486 | A1 | | 7/2013 | Wang et al. |

FOREIGN PATENT DOCUMENTS

| | | |
|---|---|---|
| JP | H03193634 | 8/1991 |
| JP | H08217476 | 8/1996 |
| JP | H11268925 | 10/1999 |
| JP | 2002003231 | 1/2002 |
| JP | 2009274434 | 11/2009 |
| JP | 2011225429 | 11/2011 |
| JP | 2013043787 | 3/2013 |
| JP | 2013063910 | 4/2013 |
| KR | 1020080063817 | 7/2008 |
| KR | 1020090032546 | 4/2009 |
| KR | 1020090110238 | 10/2009 |
| KR | 1020120132486 | 12/2012 |
| WO | 2014129454 | 8/2014 |

* cited by examiner

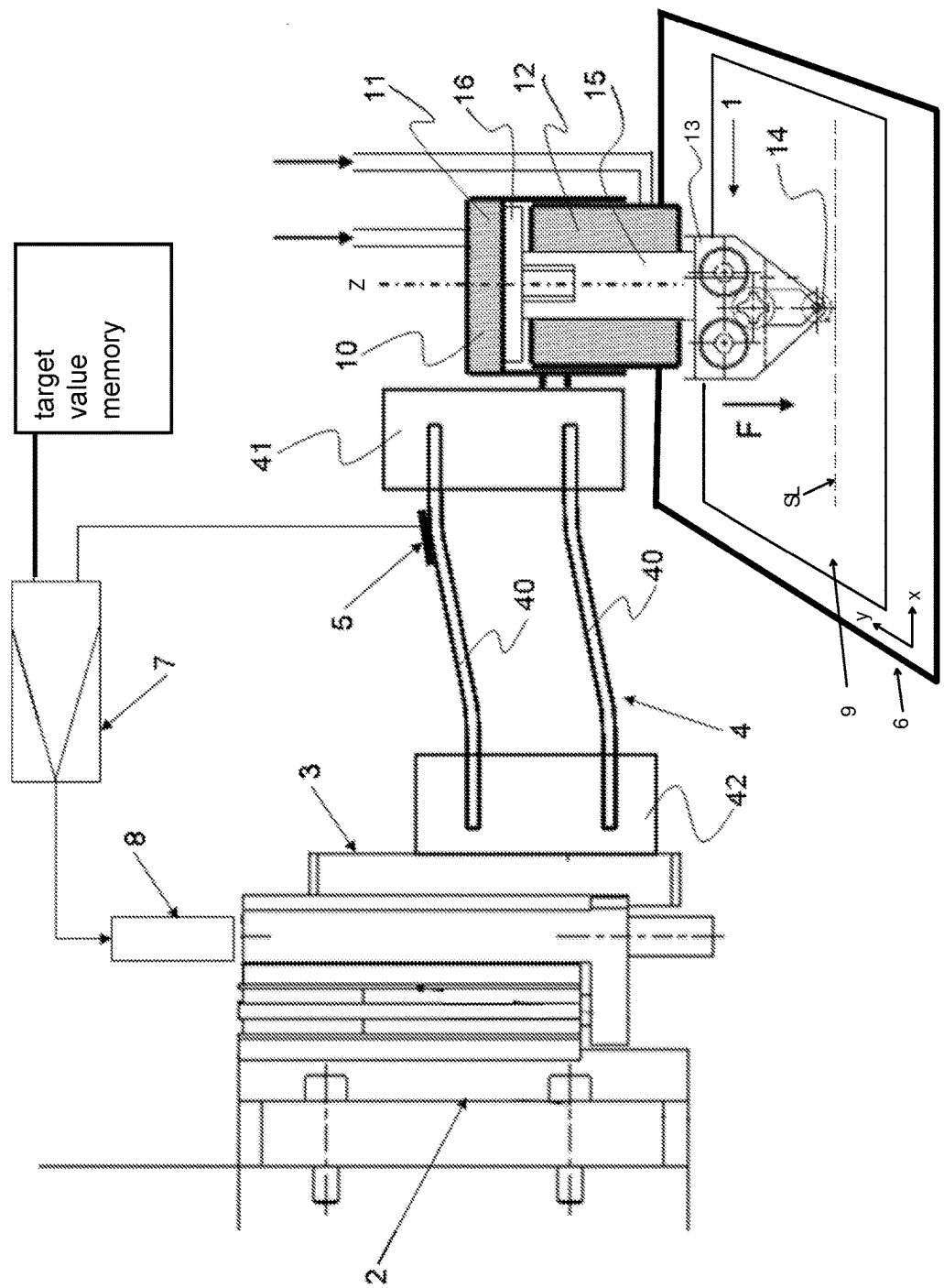

METHOD AND APPARATUS FOR SCORING THIN GLASS AND SCORED THIN GLASS

CROSS REFERENCE TO RELATED APPLICATIONS

This application claims the benefit under 35 U.S.C. § 119(a) of German Patent Application No. 10 2014 117 641.3 filed Dec. 1, 2014 and German Patent Application No. 10 2015 108 061.3 filed May 21, 2015, the entire content of both of which are incorporated herein by reference.

BACKGROUND

1. Field of the Invention

The present invention relates to a method and an apparatus for scoring thin glass along intended score lines for the purpose of score and break separation, and also relates to scored thin glass prepared by such method. Here, thin glass substantially refers to flat glass having a wall thickness in a range between 1.2 mm and 3 µm, which can be produced as a glass ribbon or glass film and can be coiled up. However, the scored thin glass should as well be produced in wafer format as a prescored plate. After breaking along the score, small thin glass plates should be obtained, which are further processed as part of a component in electrical engineering, electronics, or electric batteries.

2. Description of Related Art

Thin glasses are used in many technological fields, for example in displays, in windows for optoelectronic components, in encapsulations of components, and in electrically insulating layers. For these applications, small thin glass plates are required. However, thin glass is mainly produced as a glass ribbon or glass film, and recently thicknesses of less than 350 µm are demanded. When such a thin glass ribbon or such a thin glass film is to be processed into smaller thin glass plates, handling problems are encountered.

A processor of thin glass usually does not want to get delivered small diced thin glass plates for further processing, but thin glass coiled into rolls which is prepared for being separated into small thin glass plates. However, in the case of prescored thin glass this implies a problem. Namely, when thin glass is bend when being coiled up there is a risk of premature breakage along the score. A single breakage may already disturb the further processing process which will have to be interrupted during the unwinding of the thin glass because of the breaking site.

SUMMARY

The invention is based on the object to prepare prescored thin glass in a manner that allows reliable further processing of the prescored thin glass.

To address the risk of premature breaking along the score, the prepared scores must have a predefined quality. The scores must have a depth as uniform as possible, i.e. the scoring tool has to be directed accurately along the intended score line and with a scoring contact pressure force as constant as possible. In a thickness range between 1.2 mm and 350 µm this is possible because of the relatively great scoring contact pressure force to be set for scoring. However, if ultrathin glass (UTG) is to be scored and the scoring contact pressure force applied to the thin glass must take small values (of not more than 2 N), there is an increasing risk for the scoring tool of temporarily slipping over the surface of the glass to be scored, which is known as stick-slip phenomenon and has already been observed with prior art cutting heads.

According to a first aspect of the invention, an apparatus for scoring thin glass is provided, which permits to sufficiently exactly keep constant the scoring contact pressure force along the intended score lines by largely avoiding frictional forces. To this end, the scoring tool is pressed onto the thin glass through a parallel rocker that comprises two or more leaf springs, and is driven along the intended score line by a CNC machine tool. The scoring contact pressure force of the scoring tool is adjusted in controlled manner using a measuring device which advantageously determines the scoring contact pressure force based on the deflection of the parallel rocker from its neutral position.

In the scope of the present invention, cutting tools is a synonym for scoring tool. Likewise, the terms cutting head and scoring head are used synonymously. The cutting of a glass, for example a thin glass, is to be understood as scoring and subsequent separating. Scoring therefore is part of the cutting process. In the scope of the present invention, scoring a glass is to be understood as any weakening of the surface region, for example by producing a continuous or discontinuous kerf.

To avoid a further stick-slip phenomenon in the scoring tool holder at the scoring head, the scoring element of the scoring tool is mounted in a scoring tool housing by means of a trunnion, in aerostatic bearings with a damping supporting component in the axial direction of the trunnion and with radial guidance for a pivoting movement of the scoring tool. The scoring tool can be placed on the thin glass to be scored with a substantially constant force and can be drawn along the intended score line. If the intended score line includes curves, then the aerostatic bearings provide low-friction mounting, without the stick-slip phenomenon when using ball bearings as have commonly been used so far for supporting the trunnion of the cutting tool with cutting heads of the prior art. Moreover, the suggested scoring head exhibits a smaller moment of inertia as compared to previous conventional cutting heads of the prior art, and may be of lightweight design.

A second aspect of the invention relates to process control and processing during the scoring of the thin glass. When a predetermined scoring depth is to be kept constant, it is useful to determine an quantity derived from the scoring depth. The scoring depth is related to the extent of deflection of the parallel rocker while the scoring tool is drawn and can be calculated from the measured deflection. If irregularities of scoring resistance should occur in the thin glass, the disturbance can be kept small by means of a control loop and may be kept within the tolerance range of the scoring depth. Furthermore, a control means in the scoring apparatus permits to drive varying scoring depths, for example in order to compensate for the different score and break behavior near a peripheral edge of thin glass as compared to a more central area of the thin glass. The same is true for thin glass of varying thickness with regard to the 2-dimensional longitudinal or transverse extension thereof.

A third aspect of the invention relates to the manufacturing of prescored thin glass as a semifinished product for novel small thin glass plates which will found useful application in different areas of consumer electronics. Such small thin glass plates obtained after score and break separation are suitable as cover glass for display devices, touch panels, solar cells, semiconductor modules, or LED light sources. However, small thin glass plates can also be used as part of capacitors, thin film batteries, flexible circuit boards, flexible OLEDs, flexible photovoltaic modules, or e-papers. The type of the thin glass can be specifically chosen according to the intended application area to meet the relevant requirements for chemical resistance, thermal shock resistance, heat resistance, gas tightness, high electrical insulation, matched expansion coefficient, flexibility, high optical quality, and light transmission, with high surface quality. Thin glass has a fire-polished surface on both faces of the thin glass and therefore exhibits very low roughness.

Thin glass with a requirement profile as mentioned has a Knoop hardness HK in a range from 350 to 650. For the purposes of the invention, a Knoop hardness range between 550 and 650 is preferred, but Knoop hardness may as well assume values above 650. In case of a higher Knoop hardness, lower score depths will be sufficient for breaking along the score, which is advantageous to prevent premature breaking along the score in case of coiled thin glass material. In practice, the scoring depth may be from $1/20$ to $4/5$, preferably from $1/20$ to $1/5$ of the thickness of the thin glass, with cracks that extend into the thin glass material accounting for the scoring depth.

For the success of the scoring method presented herein, the glass composition of the thin glass is responsible as well. The following types of glass have been found to be particularly suitable: lithium aluminosilicate glass, soda-lime glass, borosilicate glass, alkali metal aluminosilicate glass, and aluminosilicate glass.

DESCRIPTION OF THE DRAWINGS

The invention will now be described by way of an exemplary embodiment of an apparatus with reference to the drawing.

The single FIGURE schematically shows a longitudinal sectional view through a scoring head of a CNC machine tool.

DETAILED DESCRIPTION

The main parts of the scoring head of the CNC machine tool include a scoring tool 1, a scoring drive mechanism 2, a drivable feed slide 3, a parallel rocker 4 and a measuring device 5. The scoring head together with the scoring tool 1 is displaceable over a work table 6 of the machine tool along horizontal x and y directions. Drivable feed slide 3 is responsible for the adjustment of the scoring tool 1 in z direction and may include a feed drive, not shown, and a precision drive 8. The feed drive serves to place the scoring tool 1 on the workpiece, i.e. thin glass 9, preferably without applying a force to thin glass 9. Precision drive 8 provides the scoring contact pressure force of the scoring tool to the thin glass 9. In order to accomplish this in a controlled manner, an actual value/target value controller 7 is provided.

Scoring tool 1 comprises a scoring tool housing 10 with aerostatic bearings 11 and 12 accommodated therein, and a scoring tool holder 13, and a scoring element 14. Generally, without being limited to the example illustrated herein, the bearings may be configured as magnetic, aerostatic and/or mechanical bearings, while appropriate measures have to be considered to reduce frictional forces. The scoring element may be formed as a sintered diamond cutting wheel, but hard metal cutting wheels and cut diamonds are useful as well. Scoring tool holder 13 comprises a trunnion 15 mounted in radial bearing 12, and a piston 16 supported on axial bearing 11. Aerostatic bearings 11, 12 are supplied with compressed air via compressed air conduits to achieve the necessary guidance and degrees of freedom of movement through air cushions generated in compressed air chambers. Scoring element 14 is attached to the scoring tool holder 13 with its axis offset to the axis of trunnion 15, so that the scoring element 14 can be drawn over the thin glass 9 along the intended scoring line trailing behind the axis of trunnion 15 as seen in the displacement direction.

Scoring tool housing 10 is attached to the drivable feed slide 3 through parallel rocker 4 in order to follow the movement thereof in the z direction until the scoring element 14 is placed on the thin glass 9. Parallel rocker 4 is a parallelogram comprising two or more leaf springs 40 and clamping components 41 and 42 which clamp the ends of the leaf springs 40. Clamping component 41 is fixed to scoring tool housing 10, and clamping component 42 to drivable feed slide 3.

In order to avoid excitation of resonant vibrations of the system of scoring tool 1 and parallel rocker 4 while drawing the scoring element 14 over the surface of thin glass 9 it is advantageous to choose a plurality of leaf springs 40 having differently steep characteristics for the configuration of parallel rocker 4. If resonant oscillations occur for one leaf spring, they are attenuated and suppressed by the other leaf springs.

Besides the variation of the number of leaf springs, it is as well possible for the configuration of the parallel rocker to vary the thickness, width, length, and material thereof. Suitable materials include metal, plastics, carbon, Kevlar, graphene, and others.

For performing scoring, the scoring tool 1 with the scoring element 14 is placed on top of the thin glass 9, as possible without contact pressure. For this purpose, "substitute touchdown" may be implemented by providing a pair of parallel stops, with a first partner having a stop surface in alignment with the horizontal plane of the lower edge of the scoring element and a second partner having a stop surface in alignment with the horizontal plane of the upper surface of the thin glass to be scored. Subsequently, the pair of parallel stops is disabled, and in a second step the thin glass 9 is subjected to the scoring contact pressure force. This is achieved by means of precision drive 8. When starting from the touchdown position of the scoring tool 1, the drivable feed slide 3 performs a downward movement in the z-direction, caused by precision drive 8, and scoring element 14 penetrates into the thin glass 9, the leaf springs 40 are biased until the required scoring contact pressure force is achieved, without involving any frictional force in the system of force generation and therefore no stick-slip phenomenon in producing the scoring contact pressure force on the thin glass. Even in case of slight variations in the surface topography of the thin glass, of the worktable, or of the driving of the machine tool in x-y direction this will not be the case. Even when driving is performed with variable scoring contact pressure force, there will be no influence of a frictional force on the adjustment of the respective scoring contact pressure force.

A piezo linear drive is appropriate as a precision drive 8. As a sensor of measuring device 5, a strain gauge can be used on one of the leaf springs 40 to determine the deflection of parallel rocker 4 in z-direction after the touchdown of scoring tool 1 on the thin glass 9. Since the spring constants of leaf springs 40 of parallel rocker 4 are known, the vertical scoring force component can be measured and displayed based on the deflection of parallel rocker 4. As mentioned, the vertical scoring force component is adjustable to desired values without frictional force component and can be maintained using the actual value/target value controller 7.

Accordingly, a control loop is provided for process control, comprising measuring device 5, actual value/target value controller 7, and precision drive 8 of feed slide 3. Actual value/target value controller 7 includes a target value memory for inputting and storing target values of the vertical scoring force component along the intended score lines, and a comparison circuit for detecting deviations between actually measured values and stored target values of the vertical scoring force component. When differences occur, i.e. a so-called error signal, the precision drive 8 of feed slide 3 is driven in the direction of reduction of the error signal. With this measure, the magnitude of the required scoring force can be ensured at any given time. If the target value memory is adapted to store varying target values, adjustable scoring force characteristics can be programmed. This is useful for process optimization.

In order for the scoring tool 1 to run along intended score lines (SL) on the thin glass 9, scoring drive mechanism 2 is provided to which the drivable feed slide 3 is mounted so as to follow, along with scoring tool 1, the movements of scoring drive mechanism 2. If a certain waviness of the thin glass surface is encountered, the impact thereof on the scoring depth can be compensated for by the control loop. Furthermore, by using aerostatic axial bearing 11 with axial air cushion, movements in the z-direction are damped, which reduces the rate of change of the scoring force component upon occurrence of waviness on the surface of the thin glass. Moreover, by using aerostatic radial bearing 12 (instead of ball bearings for mounting trunnion 15) and by using parallel rocker 4 (instead of screw drives for biasing the cutting tool relative to the workpiece) substantial inertial mass is avoided on the scoring tool, which has an impact on the accuracy of keeping the desired magnitude of the vertical scoring force component when being adjusted. This is particularly crucial because the goal is to prescore especially ultrathin glass (UTG) of less than 350 µm thickness so that it can be retained under storage conditions without erroneous premature breaking along the score lines (SL), which is a very delicate matter in terms of keeping the proper scoring depth. The apparatus and method of the invention permit to adjust extremely small magnitudes of the vertical scoring force component, so that even extremely thin glass materials can be prescored with the score line (SL) to be subsequently supplied to further processing. This is in particular due to the fact that particularly good edge strengths can be realized in this way.

The operation of the scoring head of the machine tool with resilient parallel rocker is also advantageous if the apparatus for scoring thin glass is configured without measuring and control means and without aerostatic mounting of the scoring element.

The operation of the scoring head according to the invention permits to score thin glass especially with a very uniform force application of 2 N and less; in case cutting wheels are used preferably with less than 1.2 N, and in case diamond tips are used with less than 0.5 N, without causing the so-called stick-slip phenomenon.

With the scoring head according to the invention, the inventors have succeeded in scoring thin glass with a very constant scoring force. Uniformity is in a range of ±0.05 N, preferably ±0.03 N of the nominal contact force. This provides for a virtually crack-free edge quality with associated high edge strength. By contrast, with a prior art scoring head, scoring is only possible with non-uniform scoring force and with force peaks, in particular amplified by the resulting stick-slip phenomenon, which in comparison with the invention results in an edge quality with a large number of cracks and therefore low resultant edge strength.

In a further embodiment of the invention, the scoring is performed under a controlled atmosphere, in particular in an environment specifically conditioned by a fluid phase. The fluid phase preferably comprises alcohols, more preferably absolute alcohols, most preferably absolute ethanol. Other fluids include deionized water, Lockstedter (45% herbal liqueur) and liquids which are disclosed in European patent EP 1 726 635 B1. Here, the scoring tool is enclosed by the fluid phase, at least partially and preferably completely.

In the context of the present application, thin glass refers to plate-shaped or ribbon-shaped or film-like glass with a wall thickness of <1.2 mm, or <1.0 mm, or <0.8 mm, or <0.6 mm, or <350 µm, or <250 µm, or <100 µm, or <50 µm, however, a minimum thickness of 3 µm, or 10 µm, or 15 µm is observed.

Such thin glass is often stored in form of rolls. However, if prescored thin glass is to be stored in coiled up form without breaking prematurely, special measures will be required to avoid premature breakage. The coiling must never be performed in a manner so that the scoring experiences tensions or even appears on the outer circumference of the roll coil. That means, the score openings have to face the winding core. Furthermore, the lateral edges of the thin glass, which are bent to form the roll coil, should not be weakened, because experience has shown that breakage starts on such lateral edges, even in thin glass that has not been prescored. With the invention it is possible not to extend the scoring to the edges of the thin glass. Scoring in the central area of the thin glass suffice to accomplish later breaking along the score.

To determine the correct scoring depth for prescoring thin glass, the procedure is experimental. Scorings are produced with a depth so that the desired small thin glass plates are obtained in the final processing of the thin glass and with the scoring contact pressure forces applied thereto. Then, it is determined whether the prescored thin glass can be stored without premature breakage along the score, for example in form of roll coils. If this is not the case, the geometry of the scores has to be changed in terms of scoring depth. Accordingly, the requirements for the final breaking along the score have to be re-determined to be applied when finally producing the small thin glass plates. The breaking along the score will succeed more easily the more brittle the thin glass is. Knoop hardness HK may be regarded as a measure of brittleness of thin glass. It is therefore advantageous that thin glass exhibits high Knoop hardness values, if it is to be processed into small thin glass plates. It has been found that scoring depths in a range between 1/20 and 4/5, preferably between 1/20 and 1/5 of the material thickness successfully contribute to produce storable prescored thin glass.

Below, glass compositions will be given which are suitable for thin glass having a Knoop hardness HK in a range between 550 and 650 and above, as far as available, and in particular for ultrathin glass UTG of <350 µm that is to be processed according to the method of the invention.

Example 1: Lithium Aluminosilicate Glass

| Composition | (wt %) |
|---|---|
| $SiO_2$ | 55-69 |
| $Al_2O_3$ | 18-25 |
| $Li_2O$ | 3-5 |

| Composition | (wt %) |
|---|---|
| Na$_2$O + K$_2$O | 0-30 |
| MgO + CaO + SrO + BaO | 0-5 |
| ZnO | 0-4 |
| TiO$_2$ | 0-5 |
| ZrO$_2$ | 0-5 |
| TiO$_2$ + ZrO$_2$ + SnO$_2$ | 2-6 |
| P$_2$O$_5$ | 0-8 |
| F | 0-1 |
| B$_2$O$_3$ | 0-2 |

Optionally, coloring oxides may be added to the thin glass, such as Nd$_2$O$_3$, Fe$_2$O$_3$, CoO, NiO, V$_2$O$_5$, MnO$_2$, TiO$_2$, CuO, CeO$_2$, Cr$_2$O$_3$. Additionally, from 0 to 2 wt % of As$_2$O$_3$, Sb$_2$O$_3$, SnO$_2$, SO$_3$, Cl, F, and/or CeO$_2$ may be added as a refining agent. In order to impart magnetic, photonic or optical functions to the thin glass, rare earth oxides may be added in an amount from 0 to 5 wt %. The total amount of the total composition is 100 wt %.

Example 2: Lithium Aluminosilicate Glass

| Composition | (wt %) |
|---|---|
| SiO$_2$ | 57-66 |
| Al$_2$O$_3$ | 18-23 |
| Li$_2$O | 3-5 |
| Na$_2$O + K$_2$O | 3-25 |
| MgO + CaO + SrO + BaO | 1-4 |
| ZnO | 0-4 |
| TiO$_2$ | 0-4 |
| ZrO$_2$ | 0-5 |
| TiO$_2$ + ZrO$_2$ + SnO$_2$ | 2-6 |
| P$_2$O$_5$ | 0-7 |
| F | 0-1 |
| B$_2$O$_3$ | 0-2 |

Optionally, coloring oxides may be added to the thin glass, such as Nd$_2$O$_3$, Fe$_2$O$_3$, CoO, NiO, V$_2$O$_5$, MnO$_2$, TiO$_2$, CuO, CeO$_2$, Cr$_2$O$_3$. Additionally, from 0 to 2 wt % of As$_2$O$_3$, Sb$_2$O$_3$, SnO$_2$, SO$_3$, Cl, F, and/or CeO$_2$ may be added as a refining agent. In order to impart magnetic, photonic or optical functions to the thin glass, rare earth oxides may be added in an amount from 0 to 5 wt %. The total amount of the total composition is 100 wt %.

Example 3: Lithium Aluminosilicate Glass

| Composition | (wt %) |
|---|---|
| SiO$_2$ | 57-63 |
| Al$_2$O$_3$ | 18-22 |
| Li$_2$O | 3.5-5 |
| Na$_2$O + K$_2$O | 5-20 |
| MgO + CaO + SrO + BaO | 0-5 |
| ZnO | 0-3 |
| TiO$_2$ | 0-3 |
| ZrO$_2$ | 0-5 |
| TiO$_2$ + ZrO$_2$ + SnO$_2$ | 2-5 |
| P$_2$O$_5$ | 0-5 |
| F | 0-1 |
| B$_2$O$_3$ | 0-2 |

Optionally, coloring oxides may be added to the thin glass, such as Nd$_2$O$_3$, Fe$_2$O$_3$, CoO, NiO, V$_2$O$_5$, MnO$_2$, TiO$_2$, CuO, CeO$_2$, Cr$_2$O$_3$. Additionally, from 0 to 2 wt % of As$_2$O$_3$, Sb$_2$O$_3$, SnO$_2$, SO$_3$, Cl, F, and/or CeO$_2$ may be added as a refining agent. In order to impart magnetic, photonic or optical functions to the thin glass, rare earth oxides may be added in an amount from 0 to 5 wt %. The total amount of the total composition is 100 wt %.

Example 4: Soda-Lime Glass

| Composition | (wt %) |
|---|---|
| SiO$_2$ | 40-81 |
| Al$_2$O$_3$ | 0-6 |
| B$_2$O$_3$ | 0-5 |
| Li$_2$O + Na$_2$O + K$_2$O | 5-30 |
| MgO + CaO + SrO + BaO + ZnO | 5-30 |
| TiO$_2$ + ZrO$_2$ | 0-7 |
| P$_2$O$_5$ | 0-2 |

Optionally, coloring oxides may be added to the thin glass, such as Nd$_2$O$_3$, Fe$_2$O$_3$, CoO, NiO, V$_2$O$_5$, MnO$_2$, TiO$_2$, CuO, CeO$_2$, Cr$_2$O$_3$. Additionally, from 0 to 2 wt % of As$_2$O$_3$, Sb$_2$O$_3$, SnO$_2$, SO$_3$, Cl, F, and/or CeO$_2$ may be added as a refining agent. In order to impart magnetic, photonic or optical functions to the thin glass, rare earth oxides may be added in an amount from 0 to 5 wt %. The total amount of the total composition is 100 wt %.

Example 5: Soda-Lime Glass

| Composition | (wt %) |
|---|---|
| SiO$_2$ | 50-81 |
| Al$_2$O$_3$ | 0-5 |
| B$_2$O$_3$ | 0-5 |
| Li$_2$O + Na$_2$O + K$_2$O | 5-28 |
| MgO + CaO + SrO + BaO + ZnO | 5-25 |
| TiO$_2$ + ZrO$_2$ | 0-6 |
| P$_2$O$_5$ | 0-2 |

Optionally, coloring oxides may be added to the thin glass, such as Nd$_2$O$_3$, Fe$_2$O$_3$, CoO, NiO, V$_2$O$_5$, MnO$_2$, TiO$_2$, CuO, CeO$_2$, Cr$_2$O$_3$. Additionally, from 0 to 2 wt % of As$_2$O$_3$, Sb$_2$O$_3$, SnO$_2$, SO$_3$, Cl, F, and/or CeO$_2$ may be added as a refining agent. In order to impart magnetic, photonic or optical functions to the thin glass, rare earth oxides may be added in an amount from 0 to 5 wt %. The total amount of the total composition is 100 wt %.

Example 6: Soda-Lime Glass

| Composition | (wt %) |
|---|---|
| SiO$_2$ | 55-76 |
| Al$_2$O$_3$ | 0-5 |
| B$_2$O$_3$ | 0-5 |
| Li$_2$O + Na$_2$O + K$_2$O | 5-25 |
| MgO + CaO + SrO + BaO + ZnO | 5-20 |
| TiO$_2$ + ZrO$_2$ | 0-5 |
| P$_2$O$_5$ | 0-2 |

Optionally, coloring oxides may be added to the thin glass, such as Nd$_2$O$_3$, Fe$_2$O$_3$, CoO, NiO, V$_2$O$_5$, MnO$_2$, TiO$_2$, CuO, CeO$_2$, Cr$_2$O$_3$. Additionally, from 0 to 2 wt % of As$_2$O$_3$, Sb$_2$O$_3$, SnO$_2$, SO$_3$, Cl, F, and/or CeO$_2$ may be added as a refining agent. In order to impart magnetic, photonic or optical functions to the thin glass, rare earth oxides may be added in an amount from 0 to 5 wt %. The total amount of the total composition is 100 wt %.

Example 7: Borosilicate Glass

| Composition | (wt %) |
|---|---|
| SiO$_2$ | 60-85 |
| Al$_2$O$_3$ | 0-10 |
| B$_2$O$_3$ | 5-20 |
| Li$_2$O + Na$_2$O + K$_2$O | 2-16 |
| MgO + CaO + SrO + BaO + ZnO | 0-15 |
| TiO$_2$ + ZrO$_2$ | 0-5 |
| P$_2$O$_5$ | 0-2 |

Optionally, coloring oxides may be added to the thin glass, such as Nd$_2$O$_3$, Fe$_2$O$_3$, CoO, NiO, V$_2$O$_5$, MnO$_2$, TiO$_2$, CuO, CeO$_2$, Cr$_2$O$_3$. Additionally, from 0 to 2 wt % of As$_2$O$_3$, Sb$_2$O$_3$, SnO$_2$, SO$_3$, Cl, F, and/or CeO$_2$ may be added as a refining agent. In order to impart magnetic, photonic or optical functions to the thin glass, rare earth oxides may be added in an amount from 0 to 5 wt %. The total amount of the total composition is 100 wt %.

Example 8: Borosilicate Glass

| Composition | (wt %) |
|---|---|
| SiO$_2$ | 63-84 |
| Al$_2$O$_3$ | 0-8 |
| B$_2$O$_3$ | 5-18 |
| Li$_2$O + Na$_2$O + K$_2$O | 3-14 |
| MgO + CaO + SrO + BaO + ZnO | 0-12 |
| TiO$_2$ + ZrO$_2$ | 0-4 |
| P$_2$O$_5$ | 0-2 |

Optionally, coloring oxides may be added to the thin glass, such as Nd$_2$O$_3$, Fe$_2$O$_3$, CoO, NiO, V$_2$O$_5$, MnO$_2$, TiO$_2$, CuO, CeO$_2$, Cr$_2$O$_3$. Additionally, from 0 to 2 wt % of As$_2$O$_3$, Sb$_2$O$_3$, SnO$_2$, SO$_3$, Cl, F, and/or CeO$_2$ may be added as a refining agent. In order to impart magnetic, photonic or optical functions to the thin glass, rare earth oxides may be added in an amount from 0 to 5 wt %. The total amount of the total composition is 100 wt %.

Example 9: Borosilicate Glass

| Composition | (wt %) |
|---|---|
| SiO$_2$ | 63-83 |
| Al$_2$O$_3$ | 0-7 |
| B$_2$O$_3$ | 5-18 |
| Li$_2$O + Na$_2$O + K$_2$O | 4-14 |
| MgO + CaO + SrO + BaO + ZnO | 0-10 |
| TiO$_2$ + ZrO$_2$ | 0-3 |
| P$_2$O$_5$ | 0-2 |

Optionally, coloring oxides may be added to the thin glass, such as Nd$_2$O$_3$, Fe$_2$O$_3$, CoO, NiO, V$_2$O$_5$, MnO$_2$, TiO$_2$, CuO, CeO$_2$, Cr$_2$O$_3$. Additionally, from 0 to 2 wt % of As$_2$O$_3$, Sb$_2$O$_3$, SnO$_2$, SO$_3$, Cl, F, and/or CeO$_2$ may be added as a refining agent. In order to impart magnetic, photonic or optical functions to the thin glass, rare earth oxides may be added in an amount from 0 to 5 wt %. The total amount of the total composition is 100 wt %.

Example 10: Alkali Metal Aluminosilicate Glass

| Composition | (wt %) |
|---|---|
| SiO$_2$ | 40-75 |
| Al$_2$O$_3$ | 10-30 |
| B$_2$O$_3$ | 0-20 |
| Li$_2$O + Na$_2$O + K$_2$O | 4-30 |
| MgO + CaO + SrO + BaO + ZnO | 0-15 |
| TiO$_2$ + ZrO$_2$ | 0-15 |
| P$_2$O$_5$ | 0-10 |

Optionally, coloring oxides may be added to the thin glass, such as Nd$_2$O$_3$, Fe$_2$O$_3$, CoO, NiO, V$_2$O$_5$, MnO$_2$, TiO$_2$, CuO, CeO$_2$, Cr$_2$O$_3$. Additionally, from 0 to 2 wt % of As$_2$O$_3$, Sb$_2$O$_3$, SnO$_2$, SO$_3$, Cl, F, and/or CeO$_2$ may be added as a refining agent. In order to impart magnetic, photonic or optical functions to the thin glass, rare earth oxides may be added in an amount from 0 to 5 wt %. The total amount of the total composition is 100 wt %.

Example 11: Alkali Metal Aluminosilicate Glass

| Composition | (wt %) |
|---|---|
| SiO$_2$ | 50-70 |
| Al$_2$O$_3$ | 10-27 |
| B$_2$O$_3$ | 0-18 |
| Li$_2$O + Na$_2$O + K$_2$O | 5-28 |
| MgO + CaO + SrO + BaO + ZnO | 0-13 |
| TiO$_2$ + ZrO$_2$ | 0-13 |
| P$_2$O$_5$ | 0-9 |

Optionally, coloring oxides may be added to the thin glass, such as Nd$_2$O$_3$, Fe$_2$O$_3$, CoO, NiO, V$_2$O$_5$, MnO$_2$, TiO$_2$, CuO, CeO$_2$, Cr$_2$O$_3$. Additionally, from 0 to 2 wt % of As$_2$O$_3$, Sb$_2$O$_3$, SnO$_2$, SO$_3$, Cl, F, and/or CeO$_2$ may be added as a refining agent. In order to impart magnetic, photonic or optical functions to the thin glass, rare earth oxides may be added in an amount from 0 to 5 wt %. The total amount of the total composition is 100 wt %.

Example 12: Alkali Aluminosilicate Glass

| Composition | (wt %) |
|---|---|
| SiO$_2$ | 55-68 |
| Al$_2$O$_3$ | 10-27 |
| B$_2$O$_3$ | 0-15 |
| Li$_2$O + Na$_2$O + K$_2$O | 4-27 |
| MgO + CaO + SrO + BaO + ZnO | 0-12 |
| TiO$_2$ + ZrO$_2$ | 0-10 |
| P$_2$O$_5$ | 0-8 |

Optionally, coloring oxides may be added to the thin glass, such as Nd$_2$O$_3$, Fe$_2$O$_3$, CoO, NiO, V$_2$O$_5$, MnO$_2$, TiO$_2$, $CuO$, $CeO_2$, $Cr_2O_3$. Additionally, from 0 to 2 wt % of $As_2O_3$, $Sb_2O_3$, $SnO_2$, $SO_3$, Cl, F, and/or $CeO_2$ may be added as a refining agent. In order to impart magnetic, photonic or optical functions to the thin glass, rare earth oxides may be added in an amount from 0 to 5 wt %. The total amount of the total composition is 100 wt %.

Example 13: Aluminosilicate Glass

| Composition | (wt %) |
|---|---|
| $SiO_2$ | 50-75 |
| $Al_2O_3$ | 7-25 |
| $B_2O_3$ | 0-20 |
| $Li_2O + Na_2O + K_2O$ | 0-4 |
| $MgO + CaO + SrO + BaO + ZnO$ | 5-25 |
| $TiO_2 + ZrO_2$ | 0-10 |
| $P_2O_5$ | 0-5 |

Optionally, coloring oxides may be added to the thin glass, such as $Nd_2O_3$, $Fe_2O_3$, $CoO$, $NiO$, $V_2O_5$, $MnO_2$, $TiO_2$, $CuO$, $CeO_2$, $Cr_2O_3$. Additionally, from 0 to 2 wt % of $As_2O_3$, $Sb_2O_3$, $SnO_2$, $SO_3$, Cl, F, and/or $CeO_2$ may be added as a refining agent. In order to impart magnetic, photonic or optical functions to the thin glass, rare earth oxides may be added in an amount from 0 to 5 wt %. The total amount of the total composition is 100 wt %.

Example 14: Aluminosilicate Glass

| Composition | (wt %) |
|---|---|
| $SiO_2$ | 52-73 |
| $Al_2O_3$ | 7-23 |
| $B_2O_3$ | 0-18 |
| $Li_2O + Na_2O + K_2O$ | 0-4 |
| $MgO + CaO + SrO + BaO + ZnO$ | 5-23 |
| $TiO_2 + ZrO_2$ | 0-10 |
| $P_2O_5$ | 0-5 |

Optionally, coloring oxides may be added to the thin glass, such as $Nd_2O_3$, $Fe_2O_3$, $CoO$, $NiO$, $V_2O_5$, $MnO_2$, $TiO_2$, $CuO$, $CeO_2$, $Cr_2O_3$. Additionally, from 0 to 2 wt % of $As_2O_3$, $Sb_2O_3$, $SnO_2$, $SO_3$, Cl, F, and/or $CeO_2$ may be added as a refining agent. In order to impart magnetic, photonic or optical functions to the thin glass, rare earth oxides may be added in an amount from 0 to 5 wt %. The total amount of the total composition is 100 wt %.

Example 15: Aluminosilicate Glass

| Composition | (wt %) |
|---|---|
| $SiO_2$ | 53-71 |
| $Al_2O_3$ | 7-22 |
| $B_2O_3$ | 0-18 |
| $Li_2O + Na_2O + K_2O$ | 0-4 |
| $MgO + CaO + SrO + BaO + ZnO$ | 5-22 |
| $TiO_2 + ZrO_2$ | 0-8 |
| $P_2O_5$ | 0-5 |

Optionally, coloring oxides may be added to the thin glass, such as $Nd_2O_3$, $Fe_2O_3$, $CoO$, $NiO$, $V_2O_5$, $MnO_2$, $TiO_2$, $CuO$, $CeO_2$, $Cr_2O_3$. Additionally, from 0 to 2 wt % of $As_2O_3$, $Sb_2O_3$, $SnO_2$, $SO_3$, Cl, F, and/or $CeO_2$ may be added as a refining agent. In order to impart magnetic, photonic or optical functions to the thin glass, rare earth oxides may be added in an amount from 0 to 5 wt %. The total amount of the total composition is 100 wt %.

Exemplary Embodiment 16

The composition of the glass is exemplified by the following composition, in wt %:

| $SiO_2$ | 30 to 85 |
|---|---|
| $B_2O_3$ | 3 to 20 |
| $Al_2O_3$ | 0 to 15 |
| $Na_2O$ | 3 to 15 |
| $K_2O$ | 3 to 15 |
| $ZnO$ | 0 to 12 |
| $TiO_2$ | 0.5 to 10 |
| $CaO$ | 0 to 0.1 |

Exemplary Embodiment 17

The composition of the glass is furthermore exemplified by the following composition, in wt %:

| $SiO_2$ | 58 to 65 |
|---|---|
| $B_2O_3$ | 6 to 10.5 |
| $Al_2O_3$ | 14 to 25 |
| $MgO$ | 0 to 3 |
| $CaO$ | 0 to 9 |
| $BaO$ | 3 to 8 |
| $ZnO$ | 0 to 2, | wherein, in addition, the sum of the contents of MgO, CaO, and BaO is characterized by being in a range from 8 to 18 wt %.

Exemplary Embodiment 18

The composition of the glass is furthermore exemplified by the following composition, in wt %:

| $SiO_2$ | 55 to 75 |
|---|---|
| $Na_2O$ | 0 to 15 |
| $K_2O$ | 2 to 14 |
| $Al_2O_3$ | 0 to 15 |
| $MgO$ | 0 to 4 |
| $CaO$ | 3 to 12 |
| $BaO$ | 0 to 15 |
| $ZnO$ | 0 to 5 |
| $TiO_2$ | 0 to 2 |

Exemplary Embodiment 19

Furthermore, one possible glass is exemplified by the following composition, in wt %:

| $SiO_2$ | 61 |
|---|---|
| $B_2O_3$ | 10 |
| $Al_2O_3$ | 18 |
| $MgO$ | 2.8 |
| $CaO$ | 4.8 |
| $BaO$ | 3.3 |

With this composition, characteristics of the glass are obtained as follows:

| | |
|---|---|
| $\alpha_{(20\text{-}300)}$ | $3.2 \cdot 10^{-6}/K$ |
| $T_g$ | 717° C. |
| Density | 2.43 g/cm³ |

Exemplary Embodiment 20

A further glass is exemplified by the following composition, in wt %:

| | |
|---|---|
| $SiO_2$ | 64.0 |
| $B_2O_3$ | 8.3 |
| $Al_2O_3$ | 4.0 |
| $Na_2O$ | 6.5 |
| $K_2O$ | 7.0 |
| ZnO | 5.5 |
| $TiO_2$ | 4.0 |
| $Sb_2O_3$ | 0.6 |
| $Cl^-$ | 0.1 |

With this composition, characteristics of the glass are obtained as follows:

| | |
|---|---|
| $\alpha_{(20\text{-}300)}$ | $7.2 \cdot 10^{-6}/K$ |
| $T_g$ | 557° C. |
| Density | 2.5 g/cm³ |

Exemplary Embodiment 21

Another glass is exemplified by the following composition, in wt %:

| | |
|---|---|
| $SiO_2$ | 69 +/− 5 |
| $Na_2O$ | 8 +/− 2 |
| $K_2O$ | 8 +/− 2 |
| CaO | 7 +/− 2 |
| BaO | 2 +/− 2 |
| ZnO | 4 +/− 2 |
| $TiO_2$ | 1 +/− 1 |

With this composition, characteristics of the glass are obtained as follows:

| | |
|---|---|
| $\alpha_{(20\text{-}300)}$ | $9.4 \cdot 10^{-6}/K$ |
| $T_g$ | 533° C. |
| Density | 2.55 g/cm³ |

Exemplary Embodiment 22

Yet another glass is exemplified by the following composition, in wt %:

| | |
|---|---|
| $SiO_2$ | 80 +/− 5 |
| $B_2O_3$ | 13 +/− 5 |
| $Al_2O_3$ | 2.5 +/− 2 |
| $Na_2O$ | 3.5 +/− 2 |
| $K_2O$ | 1 +/− 1 |

With this composition, characteristics of the glass are obtained as follows:

| | |
|---|---|
| $\alpha_{(20\text{-}300)}$ | $3.25 \cdot 10^{-6}/K$ |
| $T_g$ | 525° C. |
| Density | 2.2 g/cm³ |

Exemplary Embodiment 23

Yet another glass is exemplified by the following composition, in wt %:

| | |
|---|---|
| $SiO_2$ | 62.3 |
| $Al_2O_3$ | 16.7 |
| $Na_2O$ | 11.8 |
| $K_2O$ | 3.8 |
| MgO | 3.7 |
| $ZrO_2$ | 0.1 |
| $CeO_2$ | 0.1 |
| $TiO_2$ | 0.8 |
| $As_2O_3$ | 0.7 |

With this composition, characteristics of the glass are obtained as follows:

| | |
|---|---|
| $\alpha_{(20\text{-}300)}$ | $8.6 \cdot 10^{-6}/K$ |
| $T_g$ | 607° C. |
| Density | 2.4 g/cm³ |

Exemplary Embodiment 24

Yet another glass is exemplified by the following composition, in wt %:

| | |
|---|---|
| $SiO_2$ | 62.2 |
| $Al_2O_3$ | 18.1 |
| $B_2O_3$ | 0.2 |
| $P_2O_5$ | 0.1 |
| $Li_2O$ | 5.2 |
| $Na_2O$ | 9.7 |
| $K_2O$ | 0.1 |
| CaO | 0.6 |
| SrO | 0.1 |
| ZnO | 0.1 |
| $ZrO_2$ | 3.6 |

With this composition, characteristics of the glass are obtained as follows:

| | |
|---|---|
| $\alpha_{(20\text{-}300)}$ | $8.5 \cdot 10^{-6}/K$ |
| $T_g$ | 505° C. |
| Density | 2.5 g/cm³ |

Exemplary Embodiment 25

A further glass is exemplified by the following composition, in wt %:

| | |
|---|---|
| $SiO_2$ | 52 |
| $Al_2O_3$ | 17 |
| $Na_2O$ | 12 |
| $K_2O$ | 4 |
| MgO | 4 |
| CaO | 6 |

| | |
|---|---|
| ZnO | 3.5 |
| ZrO$_2$ | 1.5 |

With this composition, characteristics of the glass are obtained as follows:

| | |
|---|---|
| α$_{(20-300)}$ | 9.7 · 10$^{-6}$/K |
| T$_g$ | 556° C. |
| Density | 2.6 g/cm$^3$ |

Exemplary Embodiment 26

Yet another glass is exemplified by the following composition, in wt %:

| | |
|---|---|
| SiO$_2$ | 62 |
| Al$_2$O$_3$ | 17 |
| Na$_2$O | 13 |
| K$_2$O | 3.5 |
| MgO | 3.5 |
| CaO | 0.3 |
| SnO$_2$ | 0.1 |
| TiO$_2$ | 0.6 |

With this composition, characteristics of the glass are obtained as follows:

| | |
|---|---|
| α$_{(20-300)}$ | 8.3 · 10$^{-6}$/K |
| T$_g$ | 623° C. |
| Density | 2.4 g/cm$^3$ |

Exemplary Embodiment 27

Another glass is exemplified by the following composition, in wt %:

| | |
|---|---|
| SiO$_2$ | 61.1 |
| Al$_2$O$_3$ | 19.6 |
| B$_2$O$_3$ | 4.5 |
| Na$_2$O | 12.1 |
| K$_2$O | 0.9 |
| MgO | 1.2 |
| CaO | 0.1 |
| SnO$_2$ | 0.2 |
| CeO$_2$ | 0.3 |

With this composition, characteristics of the glass are obtained as follows:

| | |
|---|---|
| α$_{(20-300)}$ | 8.9 · 10$^{-6}$/K |
| T$_g$ | 600° C. |
| Density | 2.4 g/cm$^3$ |

Exemplary Embodiment 28

Yet another glass is exemplified by the following composition, in wt %:

| | |
|---|---|
| SiO$_2$ | 50 to 65 |
| Al$_2$O$_3$ | 15 to 20 |
| B$_2$O$_3$ | 0 to 6 |
| Li$_2$O | 0 to 6 |
| Na$_2$O | 8 to 15 |
| K$_2$O | 0 to 5 |
| MgO | 0 to 5 |
| CaO | 0 to 7, preferably 0 to 1 |
| ZnO | 0 to 4, preferably 0 to 1 |
| ZrO$_2$ | 0 to 4 |
| TiO$_2$ | 0 to 1, preferably substantially free of TiO$_2$. |

Further constituents of the glass may include: from 0 to 1 wt %: P$_2$O$_5$, SrO, BaO; and from 0 to 1 wt % of refining agents SnO$_2$, CeO$_2$, or As$_2$O$_3$, or other refining agents.

Exemplary Embodiment 29

Yet another glass is exemplified by the following composition, in wt %:

| | |
|---|---|
| SiO$_2$ | 58 to 65 |
| B$_2$O$_3$ | 6 to 10.5 |
| Al$_2$O$_3$ | 14 to 25 |
| MgO | 0 to 5 |
| CaO | 0 to 9 |
| BaO | 0 to 8 |
| SrO | 0 to 8 |
| ZnO | 0 to 2 |

Exemplary Embodiment 30

Yet another glass is exemplified by the following composition, in wt %:

| | |
|---|---|
| SiO$_2$ | 59.7 |
| Al$_2$O$_3$ | 17.1 |
| B$_2$O$_3$ | 7.8 |
| MgO | 3.4 |
| CaO | 4.2 |
| SrO | 7.7 |
| BaO | 0.1 |

With this composition, characteristics of the glass are obtained as follows:

| | |
|---|---|
| α$_{(20-300)}$ | 3.8 · 10$^{-6}$/K |
| T$_g$ | 719° C. |
| Density | 2.51 g/cm$^3$ |

Exemplary Embodiment 31

Yet another glass is exemplified by the following composition, in wt %:

| | |
|---|---|
| SiO$_2$ | 59.6 |
| Al$_2$O$_3$ | 15.1 |
| B$_2$O$_3$ | 9.7 |
| CaO | 5.4 |
| SrO | 6.0 |
| BaO | 2.3 |
| ZnO | 0.5 |
| Sb$_2$O$_3$ | 0.4 |
| As$_2$O$_3$ | 0.7 |

With this composition, characteristics of the glass are obtained as follows:

| | |
|---|---|
| $\alpha_{(20-300)}$ | $3.8 \cdot 10^{-6}$/K |
| Density | 2.5 g/cm$^3$ |

Exemplary Embodiment 32

Yet another glass is exemplified by the following composition, in wt %:

| | |
|---|---|
| SiO$_2$ | 58.8 |
| Al$_2$O$_3$ | 14.6 |
| B$_2$O$_3$ | 10.3 |
| MgO | 1.2 |
| CaO | 4.7 |
| SrO | 3.8 |
| BaO | 5.7 |
| Sb$_2$O$_3$ | 0.2 |
| As$_2$O$_3$ | 0.7 |

With this composition, characteristics of the glass are obtained as follows:

| | |
|---|---|
| $\alpha_{(20-300)}$ | $3.73 \cdot 10^{-6}$/K |
| T$_g$ | 705° C. |
| Density | 2.49 g/cm$^3$ |

Exemplary Embodiment 33

Yet another glass is exemplified by the following composition, in wt %:

| | |
|---|---|
| SiO$_2$ | 62.5 |
| B$_2$O$_3$ | 10.3 |
| Al$_2$O$_3$ | 17.5 |
| MgO | 1.4 |
| CaO | 7.6 |
| SrO | 0.7 |

With this composition, characteristics of the glass are obtained as follows:

| | |
|---|---|
| $\alpha_{(20-300)}$ | 3.2 ppm/K |
| Density: | 2.38 g/cm$^3$ |

Exemplary Embodiment 34

Yet another glass is exemplified by the following composition, in wt %:

| | |
|---|---|
| SiO$_2$ | 55 to 75 |
| Na$_2$O | 0 to 15 |
| K$_2$O | 0 to 14 |
| Al$_2$O$_3$ | 0 to 15 |
| MgO | 0 to 4 |
| CaO | 3 to 12 |
| BaO | 0 to 15 |
| ZnO | 0 to 5 |

Exemplary Embodiment 35

Yet another glass is exemplified by the following composition, in wt %:

| | |
|---|---|
| SiO$_2$ | 74.3 |
| Na$_2$O | 13.2 |
| K$_2$O | 0.3 |
| Al$_2$O$_3$ | 1.3 |
| MgO | 0.2 |
| CaO | 10.7 |

With this composition, characteristics of the glass are obtained as follows:

| | |
|---|---|
| $\alpha_{(20-300)}$ | 9.0 ppm/K |
| T$_g$: | 573° C. |

Exemplary Embodiment 36

Yet another glass is exemplified by the following composition, in wt %:

| | |
|---|---|
| SiO$_2$ | 72.8 |
| Na$_2$O | 13.9 |
| K$_2$O | 0.1 |
| Al$_2$O$_3$ | 0.2 |
| MgO | 4.0 |
| CaO | 9.0 |

With this composition, characteristics of the glass are obtained as follows:

| | |
|---|---|
| $\alpha_{(20-300)}$ | 9.5 ppm/K |
| T$_g$: | 564° C. |

Unless already listed, all of the above embodiments 16 to 36 may optionally include refining agents from 0 to 1 wt %, for example SnO$_2$, CeO$_2$, As$_2$O$_3$, Cl$^-$, F$^-$, sulphates.

The glasses of the listed examples are particularly suitable for producing ultrathin flexible glass ribbons and glass films of a thickness range between 350 μm and 3 μm. Preferred glass thicknesses are 5 μm, 10 μm, 15 μm, 25 μm, 30 μm, 35 μm, 50 μm, 55 μm, 70 μm, 80 μm, 100 μm, 130 μm, 145 μm, 160 μm, 190 μm, 210 μm, and 280 μm.

Such glass ribbons and glass films are processed with an adjusted scoring contact pressure force as a vertical scoring force component to the thin glass, to be provided as a prescored thin glass for further processing into thin glass plates. For the first time, this permits to produce prescored ultrathin glass of a Knoop hardness HK between 350 and 650 with a score depth in a range between 1/20 and 4/5, preferably between 1/20 and 1/5 of the material thickness.

What is claimed is:
1. A method for scoring a sheet of thin glass along an intended score line for the purpose of score and break separation, comprising the steps of:
providing the sheet of thin glass on a worktable of a machine tool, the machine tool comprising a scoring tool, a drivable feed slide, and a parallel rocker, the parallel rocker comprising biasing leaf springs having first ends connected to the drivable feed slide and second ends connected to the scoring tool, the parallel rocker being deflected by displacement of the drivable feed slide along an axis that is perpendicular to the sheet of thin glass;

placing the scoring tool on the sheet of thin glass with a scoring force component along the axis;

drawing the scoring tool on the sheet of thin glass along the intended score line;

measuring, while drawing the scoring tool, the scoring force component by an extent of deflection of the parallel rocker; and adjusting the scoring force component, while drawing the scoring tool, based on the measured scoring force component.

2. A method for scoring thin glass along an intended score line for the purpose of score and break separation, comprising the steps of:

providing a sheet of thin glass on a worktable of a machine tool that includes a scoring drive mechanism which is equipped with a driveable feed slide, a parallel rocker fixed to the driveable feed slide and a scoring tool mounted in a tool housing, the tool housing being secured to the parallel rocker;

approaching the scoring tool to the sheet of thin glass and vertically placing the scoring tool on the sheet of thin glass;

biasing leaf springs that are arranged in form of a parallelogram forming the parallel rocker and that have leaf spring ends clamped at a first component of the drivable feed slide on one end, and on the other end at a second component to which the tool housing of the scoring tool is secured, wherein upon deflection of the parallel rocker by parallel displacement of the drivable feed slide relative to an axis of the scoring tool, a vertical scoring force component perpendicular to the sheet of thin glass is adjustable without interference by any frictional force component;

drawing the scoring tool on the sheet of thin glass along the intended score line with an adjusted vertical scoring force component, and measuring, while drawing the scoring tool, a vertical scoring force component by an extent of deflection of the parallel rocker.

3. The method as claimed in claim 2, wherein the machine tool comprises a control loop including a target value memory for the feed slide, from which target values of the vertical scoring force component along the intended score line are taken and compared to measured actual values of the vertical scoring force component, in a comparison circuit, to obtain a respective control signal in case of a deviation, to drive the feed slide so as to offset the deviation.

4. The method as claimed in claim 2, wherein the scoring is effected by applying a uniform force of 2 N and less.

5. The method as claimed in claim 2, wherein the scoring is effected by applying a uniform force of less than 0.5 N.

6. The method as claimed in claim 2, wherein the scoring is effected with a constant scoring force with a uniformity in a range of ±0.05 N.

7. The method as claimed in claim 2, wherein the scoring is effected under a controlled atmosphere.

8. The method as claimed in claim 2, wherein the scoring is effected in an environment specifically conditioned by a fluid phase.

9. The method as claimed in claim 8, wherein the fluid phase comprises a fluid selected from the group consisting of alcohols, absolute alcohols, and absolute ethanol.

10. The method as claimed in claim 8, wherein the scoring tool is at least partially enclosed by the fluid phase.

11. The method as claimed in claim 8, wherein the scoring tool is completely enclosed by the fluid phase.

12. The method as claimed in claim 2, wherein the step of providing the sheet of thin glass comprises providing the sheet of thin glass with a material thickness in a range between 350 µm and 3 µm.

13. The method as claimed in claim 2, wherein the step of providing the sheet of thin glass comprises providing the sheet of thin glass with a Knoop hardness in a range from 350 to 650.

14. The method as claimed in claim 2, wherein the step of providing the sheet of thin glass comprises providing the sheet of thin glass with a glass composition of:

| Composition | (wt %) |
| --- | --- |
| $SiO_2$ | 57-66; |
| $Al_2O_3$ | 18-23; |
| $Li_2O$ | 3-5; |
| $Na_2O + K_2O$ | 3-25; |
| $MgO + CaO + SrO + BaO$ | 1-4; |
| $ZnO$ | 0-4; |
| $TiO_2$ | 0-4; |
| $ZrO_2$ | 0-5; |
| $TiO_2 + ZrO_2 + SnO_2$ | 2-6; |
| $P_2O_5$ | 0-7; |
| F | 0-1; and |
| $B_2O_3$ | 0-2. |

15. The method as claimed in claim 2, wherein the step of providing the sheet of thin glass comprises providing the sheet of thin glass with a glass composition of:

| Composition | (wt %) |
| --- | --- |
| $SiO_2$ | 57-63; |
| $Al_2O_3$ | 18-22; |
| $Li_2O$ | 3.5-5; |
| $Na_2O + K_2O$ | 5-20; |
| $MgO + CaO + SrO + BaO$ | 0-5; |
| $ZnO$ | 0-3; |
| $TiO_2$ | 0-3; |
| $ZrO_2$ | 0-5; |
| $TiO_2 + ZrO_2 + SnO_2$ | 2-5; |
| $P_2O_5$ | 0-5; |
| F | 0-1; and |
| $B_2O_3$ | 0-2. |

16. The method as claimed in claim 2, wherein the step of providing the sheet of thin glass comprises providing the sheet of thin glass with a glass composition of:

| Composition | (wt %) |
| --- | --- |
| $SiO_2$ | 50-81; |
| $Al_2O_3$ | 0-5; |
| $B_2O_3$ | 0-5; |
| $Li_2O + Na_2O + K_2O$ | 5-28; |
| $MgO + CaO + SrO + BaO + ZnO$ | 5-25; |
| $TiO_2 + ZrO_2$ | 0-6; and |
| $P_2O_5$ | 0-2. |

17. The method as claimed in claim 2, wherein the step of providing the sheet of thin glass comprises providing the sheet of thin glass with a glass composition of:

| Composition | (wt %) |
| --- | --- |
| $SiO_2$ | 55-76; |
| $Al_2O_3$ | 0-5; |
| $B_2O_3$ | 0-5; |

| Composition | (wt %) |
| --- | --- |
| $Li_2O + Na_2O + K_2O$ | 5-25; |
| $MgO + CaO + SrO + BaO + ZnO$ | 5-20; |
| $TiO_2 + ZrO_2$ | 0-5; and |
| $P_2O_5$ | 0-2. |

18. The method as claimed in claim 2, wherein the step of providing the sheet of thin glass comprises providing the sheet of thin glass with a glass composition of:

| Composition | (wt %) |
| --- | --- |
| $SiO_2$ | 63-84; |
| $Al_2O_3$ | 0-8; |
| $B_2O_3$ | 5-18; |
| $Li_2O + Na_2O + K_2O$ | 3-14; |
| $MgO + CaO + SrO + BaO + ZnO$ | 0-12; |
| $TiO_2 + ZrO_2$ | 0-4; and |
| $P_2O_5$ | 0-2. |

19. The method as claimed in claim 2, wherein the step of providing the sheet of thin glass comprises providing the sheet of thin glass with a glass composition of:

| Composition | (wt %) |
| --- | --- |
| $SiO_2$ | 63-83; |
| $Al_2O_3$ | 0-7; |
| $B_2O_3$ | 5-18; |
| $Li_2O + Na_2O + K_2O$ | 4-14; |
| $MgO + CaO + SrO + BaO + ZnO$ | 0-10; |
| $TiO_2 + ZrO_2$ | 0-3; and |
| $P_2O_5$ | 0-2. |

20. The method as claimed in claim 2, wherein the step of providing the sheet of thin glass comprises providing the sheet of thin glass with a glass composition of:

| Composition | (wt %) |
| --- | --- |
| $SiO_2$ | 50-70; |
| $Al_2O_3$ | 10-27; |
| $B_2O_3$ | 0-18; |
| $Li_2O + Na_2O + K_2O$ | 5-28; |
| $MgO + CaO + SrO + BaO + ZnO$ | 0-13; |
| $TiO_2 + ZrO_2$ | 0-13; and |
| $P_2O_5$ | 0-9. |

21. The method as claimed in claim 2, wherein the step of providing the sheet of thin glass comprises providing the sheet of thin glass with a glass composition of:

| Composition | (wt %) |
| --- | --- |
| $SiO_2$ | 55-68; |
| $Al_2O_3$ | 10-27; |
| $B_2O_3$ | 0-15; |
| $Li_2O + Na_2O + K_2O$ | 4-27; |
| $MgO + CaO + SrO + BaO + ZnO$ | 0-12; |
| $TiO_2 + ZrO_2$ | 0-10; and |
| $P_2O_5$ | 0-8. |

22. The method as claimed in claim 2, wherein the step of providing the sheet of thin glass comprises providing the sheet of thin glass with a glass composition of:

| Composition | (wt %) |
| --- | --- |
| $SiO_2$ | 52-73; |
| $Al_2O_3$ | 7-23; |
| $B_2O_3$ | 0-18; |
| $Li_2O + Na_2O + K_2O$ | 0-4; |
| $MgO + CaO + SrO + BaO + ZnO$ | 5-23; |
| $TiO_2 + ZrO_2$ | 0-10; and |
| $P_2O_5$ | 0-5. |

23. The method as claimed in claim 2, wherein the step of providing the sheet of thin glass comprises providing the sheet of thin glass with a glass composition of:

| Composition | (wt %) |
| --- | --- |
| $SiO_2$ | 53-71; |
| $Al_2O_3$ | 7-22; |
| $B_2O_3$ | 0-18; |
| $Li_2O + Na_2O + K_2O$ | 0-4; |
| $MgO + CaO + SrO + BaO + ZnO$ | 5-22; |
| $TiO_2 + ZrO_2$ | 0-8; and |
| $P_2O_5$ | 0-5. |

\* \* \* \* \*